United States Patent
Ober et al.

(10) Patent No.: US 11,123,971 B2
(45) Date of Patent: *Sep. 21, 2021

(54) METHOD AND DEVICE FOR PRODUCING A PROFILED ELEMENT

(71) Applicant: Hilti Aktiengesellschaft, Schaan (LI)

(72) Inventors: Andreas Ober, Kaufering (DE); Markus Weiling, Landsberg (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

This patent is subject to a terminal disclaimer.

(21) Appl. No.: 16/946,308

(22) Filed: Jun. 16, 2020

(65) Prior Publication Data
US 2020/0316929 A1 Oct. 8, 2020

Related U.S. Application Data

(62) Division of application No. 15/573,400, filed as application No. PCT/EP2016/060496 on May 11, 2016, now Pat. No. 10,723,110.

(30) Foreign Application Priority Data

May 11, 2015 (EP) ..................... 15167086

(51) Int. Cl.
*B32B 27/40* (2006.01)
*B32B 37/00* (2006.01)
(Continued)

(52) U.S. Cl.
CPC .......... *B32B 37/0046* (2013.01); *B29C 44/18* (2013.01); *B29C 44/324* (2013.01);
(Continued)

(58) Field of Classification Search
CPC ... B29C 44/18; B29C 44/324; B29C 44/5627; B29C 65/02; B29K 2075/00;
(Continued)

(56) References Cited

U.S. PATENT DOCUMENTS 2,898,634 A 8/1959 Alderfer
3,240,845 A 3/1966 Voelker
(Continued)

FOREIGN PATENT DOCUMENTS

DE 1 260 124 1/1968
DE 30 38 524 4/1982
(Continued)

OTHER PUBLICATIONS

International Search Report dated Jul. 20, 2016 in PCT/EP2016/060496, with English translation, 5 pages.
(Continued)

*Primary Examiner* — Lawrence D Ferguson
(74) *Attorney, Agent, or Firm* — Grüneberg and Myers PLLC

(57) ABSTRACT

A profile element is useful for sealing building-structure joints, especially for sealing against sound and smoke and optionally against fire. An apparatus is useful for manufacturing such profile element and to the use of the profile element manufactured according to the invention for the acoustic, smokeproof and/or fireproof sealing of connecting joints in drywalls, especially of expansion joints.

20 Claims, 3 Drawing Sheets

(51) Int. Cl.

| | | |
|---|---|---|
| *E04B 1/94* | (2006.01) | |
| *E04B 2/74* | (2006.01) | |
| *B29C 44/32* | (2006.01) | |
| *E04B 1/68* | (2006.01) | |
| *B32B 3/26* | (2006.01) | |
| *B29C 44/18* | (2006.01) | |
| *B29C 65/02* | (2006.01) | |
| *B32B 1/00* | (2006.01) | |
| *B32B 37/06* | (2006.01) | |
| *B32B 37/24* | (2006.01) | |
| *E04B 1/84* | (2006.01) | |
| *B29K 623/00* | (2006.01) | |
| *B29K 675/00* | (2006.01) | |
| *B29K 627/06* | (2006.01) | |
| *B29C 44/56* | (2006.01) | |
| *B29K 75/00* | (2006.01) | |
| *B29K 105/20* | (2006.01) | |
| *B29L 31/26* | (2006.01) | |

(52) U.S. Cl.
CPC ............... *B29C 65/02* (2013.01); *B32B 1/00* (2013.01); *B32B 3/266* (2013.01); *B32B 27/40* (2013.01); *B32B 37/06* (2013.01); *B32B 37/24* (2013.01); *E04B 1/6812* (2013.01); *E04B 1/84* (2013.01); *E04B 1/948* (2013.01); *E04B 2/7411* (2013.01); *B29C 44/5627* (2013.01); *B29K 2075/00* (2013.01); *B29K 2105/20* (2013.01); *B29K 2623/06* (2013.01); *B29K 2623/12* (2013.01); *B29K 2627/06* (2013.01); *B29K 2675/00* (2013.01); *B29K 2995/0001* (2013.01); *B29K 2995/0016* (2013.01); *B29K 2995/0067* (2013.01); *B29L 2031/26* (2013.01); *B32B 2037/243* (2013.01); *B32B 2305/02* (2013.01); *B32B 2307/10* (2013.01); *B32B 2307/3065* (2013.01); *B32B 2307/7242* (2013.01); *B32B 2375/00* (2013.01); *B32B 2581/00* (2013.01); *E04B 2/7457* (2013.01)

(58) Field of Classification Search
CPC ............ B29K 2105/20; B29K 2623/06; B29K 2623/12; B29K 2627/06; B29K 2675/00; B29K 2995/0001; B29K 2995/0016; B29K 2995/0067; B29L 2031/26; B32B 1/00; B32B 2037/243; B32B 2305/02; B32B 2307/10; B32B 2307/3065; B32B 2307/7242; B32B 2375/00; B32B 2581/00; B32B 27/40; B32B 37/0046; B32B 37/06; B32B 37/24; B32B 3/266; E04B 1/6812; E04B 1/84; E04B 1/948; E04B 2/7411; E04B 2/7457

See application file for complete search history.

(56) References Cited

U.S. PATENT DOCUMENTS

| | | |
|---|---|---|
| 3,325,573 A | 6/1967 | Boon et al. |
| 5,475,948 A | 12/1995 | Parke |
| 5,897,818 A | 4/1999 | Lewit et al. |
| 6,090,479 A | 7/2000 | Shirato et al. |
| 8,733,019 B2 | 5/2014 | Vulpitta |
| 10,195,789 B2 | 2/2019 | Abe et al. |
| 10,723,110 B2 * | 7/2020 | Ober .................. B32B 27/40 |
| 2004/0109984 A1 | 6/2004 | Bouic |
| 2005/0159057 A1 | 7/2005 | Hauber et al. |
| 2009/0107623 A1 | 4/2009 | Davidson et al. |

FOREIGN PATENT DOCUMENTS

| | | |
|---|---|---|
| DE | 40 06 997 | 9/1991 |
| DE | 10 2010 008570 A1 | 8/2011 |
| EP | 2 826 611 | 1/2015 |
| GB | 833552 A | 4/1960 |
| WO | 2014/005880 | 1/2014 |

OTHER PUBLICATIONS

Witten Opinion dated Jul. 20, 2016 in PCT/EP2016/060496, with English translation, 14 pages.

* cited by examiner

METHOD AND DEVICE FOR PRODUCING A PROFILED ELEMENT

CROSS-REFERENCE TO RELATED APPLICATIONS

This application is a Divisional application of U.S. application Ser. No. 15/573,400, filed Nov. 10, 2017, which is a National Stage entry under § 371 of International Application No. PCT/EP2016/060496, filed on May 11, 2016, and which claims the benefit of European Application No. 15167086.6, filed on May 11, 2015. The contents of each of the above applications are hereby incorporated by reference in their entireties.

BACKGROUND OF THE INVENTION

Field of the Invention

The present invention relates to a method for manufacturing a profile element for sealing building-structure joints, especially for sealing against sound and smoke and optionally against fire, to an apparatus for manufacturing such a profile element and to the use of the profile element manufactured according to the invention for the acoustic, smokeproof and/or fireproof sealing of connecting joints in drywalls, especially of expansion joints. In particular, the invention relates to an improved method for continuous and endless manufacture of such a profile element.

Discussion of the Background

Connecting joints are usually formed when different building parts meet. Connecting joints are found in the region of connection to the inter-story ceiling, to the floor and to massive walls. Due to weight loading or thermal influences, the ceiling in buildings may be forced upward or downward. To prevent damage to the drywall, the upper connecting joint in this case is made as an expansion joint. Thus joints for creating discontinuities in building parts in order to prevent stress cracking are known as expansion joints. The ceiling profile is made in such a way that a relative movement between ceiling profile and the vertical wall components is possible.

In general, a channel profile constituting part of the studwork is fastened to the connecting building parts. The gypsum boards themselves are attached at a well-defined spacing to the connecting building part. Usually sealing of the system is provided in the gap between gypsum board and ceiling. For this purpose, either a suitable sealing compound is introduced, processed with joint spray, or else the gap is provided with a joint cord or filled with mineral wool and provided at the surface with a sealing layer. In these cases, the material present in the joint presents relatively strong resistance to movement, with the consequence that comparatively large joint widths are necessary in order to achieve adequate movement absorption.

Different methods for manufacturing profile elements, such as profile strands and joint cords, for sealing of building-structure joints, especially connecting joints, against smoke and fire are known from the prior art.

DE 3038524 A1 describes an expansion-joint tape, which is provided with a flexible tube, wherein the expansion-joint tape is introduced into a joint between the concrete elements. The flexible tube is used to fill subsequently with further joint material, such as polyurethane, in order to seal the joint at a later time, but this makes mounting and handling difficult.

DE 4006997 A1 describes a method and an apparatus for manufacturing profile strands of fire-protection foam materials using a reaction mixture that is prepared in a mixer then filled into a closed, flexible and airtight film tube, wherein the film tube is removed before use of the profile strand.

DE 102010008570 A1 describes a method for manufacturing a fire-protection joint cord, wherein an intumescent foam flows into a tube and is foamed. A disadvantage in DE 102010008570 A1 is the predetermined diameter of the tube as well as backing-up of the material compound that may occur during the manufacturing process or is insufficient material compound in the manufactured joint cord.

The prior art systems exhibit further additional disadvantages, such as, for example, considerable time consumption during manufacture due to complex steps of cleaning of the system or due to tedious setting-up, high costs, buildup of the joint cord or of the profile element comprising several components or complex construction elements, poor cuttability, high weight or very inconvenient mounting for building-structure joints, especially for connecting joints.

The object of the invention is therefore to provide a method for manufacturing a profile element for sealing building-structure joints, especially for sealing against sound and smoke and optionally against fire, which method avoids the disadvantages of the known methods. In particular, the object of the present invention is to provide an improved method for continuous and endless manufacture of such a profile element.

A further object of the present invention is to provide an apparatus that permits cost-effective, economic, continuous and endless manufacture of a profile element.

A further object of the present invention is to provide the use of the profile element manufactured according to the invention for acoustic, smokeproof and/or fireproof sealing of connecting joints in drywalls, especially of expansion joints.

These and further objects that will become apparent from the description of the invention hereinafter are solved by the present invention, as described in the independent claims. The dependent claims relate to preferred embodiments.

SUMMARY OF THE INVENTION

The present invention relates to a method for manufacturing a profile element for sealing a building-structure joint, comprising the following steps:
 a) providing a film,
 b) applying a free-flowing reaction mixture on an upper side of the film,
 c) joining a first side-edge region of the film with a second side-edge region of the film to create a substantially cylindrical profile element, wherein the volume of the free-flowing reaction mixture to be applied is dosed such that it corresponds to the inside volume of the manufactured profile element, and wherein the film completely encloses the reaction mixture.

The present invention further relates to an apparatus for manufacturing a profile element for sealing a building-structure joint, with a casting system for mixing and applying a free-flowing reaction mixture, characterized by
 a) a feed apparatus for feeding the film,
 b) a roll for perforating the film,
 c) at least one conveying means for laying the film flat and conveying it, d) a forming shoulder for shaping the profile element, e) a thermal welding system for joining a first side-edge region of the film with a second side-edge region of the film, f) a reaction section for foaming the free-flowing reaction mixture, g) conveying equipment for exactly guiding the film, h) a cutting unit for cutting the profile element to the desired length, and i) optionally at least one metal profile for shaping the profile to the desired geometry.

The present invention further relates to the use of the profile element manufactured according to the invention for acoustic, smokeproof and/or fireproof sealing of connecting joints in drywalls, especially of expansion joints.

Some other objects and features of this invention are obvious and some will be explained hereinafter. In particular, the subject matter of the present invention will be described in detail by reference to the following figures:

DETAILED DESCRIPTION OF THE INVENTION

Figure 1:
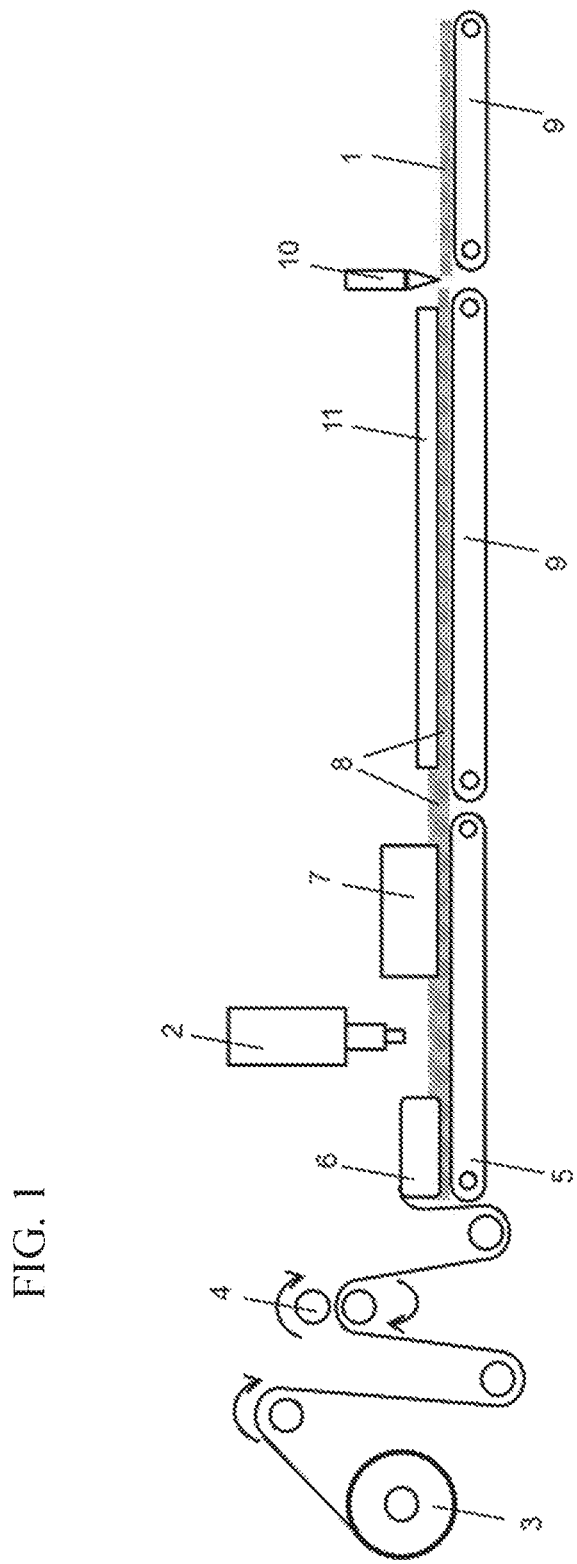
FIG. 1 shows a sketched embodiment of the inventive apparatus for manufacturing a profile element.

The following terms are used within the scope of the present invention:

Within the scope of the present invention, the term "profile geometry" comprises various cross-section types of the profile element. This means that particularly the sealing regions of the profile element may have different cross-section types. Cross-section types are understood among other possibilities as round profile (round cross section), polygonal profile (polygonal cross section), especially square profile (square cross section), rectangular profile (rectangular cross section), parallelogram profile (cross section in the shape of a parallelogram), triangular profile (triangular cross section), etc.

Within the scope of the present invention, the term "deformable" means that irregularities in the building part, against which the profile element is pressed, can be evened out. In this connection, "plastically deformable" means that the profile element is deformable and no longer returns to its original shape after deformation. Analogously, "elastically deformable" means that the profile element is deformable and returns to its original shape after deformation, i.e. the material can be deformed reversibly to a certain extent.

The terms "exhibit", "with" and "have" are intended to be inclusive and mean that elements other than those cited may also be meant.

Within the scope of the present invention, the term "intumescence" means that, under the effect of heat, for example in the event of a fire, the material swells and forms an insulating layer of flame-retardant material, i.e. intumescence.

Within the scope of the present invention, "slow-burning foam" is understood as a foam that offers no possibility of fire propagation due to the foam, is not spontaneously flammable and also does not drip.

As used within the scope of the present invention, the singular forms "one", "a" and "an" also include the corresponding plural forms, unless something different can be inferred unambiguously from the relationship. Thus, for example, the term "one" is intended to mean "one or more" or "at least one", unless otherwise indicated.

In one aspect, the present invention relates to a method for manufacturing a profile element for sealing a building-structure joint, comprising the following steps:

a) providing a film, b) applying a free-flowing reaction mixture on an upper side of the film, c) joining a first side-edge region of the film with a second side-edge region of the film to create a substantially cylindrical profile element, wherein the volume of the free-flowing reaction mixture to be applied is dosed such that it corresponds to the inside volume of the manufactured profile element, and wherein the film completely encloses the reaction mixture.

In a further aspect, the present invention relates to an apparatus for manufacturing a profile element for sealing a building-structure joint, with a casting system for mixing and applying a free-flowing reaction mixture, characterized by a) a feed apparatus for feeding the film, b) a roll for perforating the film, c) at least one conveying means for laying the film flat and conveying it, d) a forming shoulder for shaping the profile element, e) a thermal welding system for joining a first side-edge region of the film with a second side-edge region of the film, f) a reaction section for foaming the free-flowing reaction mixture, g) conveying equipment for exactly guiding the film, h) a cutting unit for cutting the profile element to the desired length, and i) optionally at least one metal profile for shaping the profile to the desired geometry.

In yet a further aspect, the present invention relates to the use of the profile element manufactured according to the invention for acoustic, smokeproof and/or fireproof sealing of connecting joints in drywalls, especially of expansion joints.

It has been discovered that the inventive method is particularly suitable for manufacturing a profile element in simple, continuous, economic and cost-effective manner, for safely sealing a building-structure joint between two adjacent building parts, especially against sound and/or smoke and optionally also against fire.

Therefore it is an objective of the present invention to describe the method for manufacturing a profile element for sealing a building-structure joint. Furthermore, it is an objective of the present invention to describe in detail the apparatus for manufacturing a profile element for sealing a building-structure joint. Furthermore, it is an objective of the present invention to describe the use of the profile element manufactured according to the invention for acoustic, smokeproof and/or fireproof sealing of connecting joints in drywalls, especially of expansion joints.

Such a profile element can be manufactured according to the invention by applying a suitable free-flowing reaction mixture on a flat film, then joining a first side-edge region thereof with a second side-edge region to create a substantially cylindrical profile element, wherein the foaming, deformable material then passes together with the film through a reaction section and is formed to a profile element.

Therefore the inventive method for manufacturing a profile element for sealing a building-structure joint comprises the following steps:

a) providing a film, b) applying a free-flowing reaction mixture on an upper side of the film, c) joining a first side-edge region of the film with a second side-edge region of the film to create a substantially cylindrical profile element, wherein the volume of the free-flowing reaction mixture to be applied is dosed such that, in the fully reacted state, it corresponds to the inside volume of the manufactured profile element, and wherein the film completely encloses the reaction mixture.

Furthermore, the inventive method comprises the following steps:

d) foaming the free-flowing reaction mixture, e) optionally shaping the profile to the desired geometry, and f) cutting the profile element to the desired length.

According to the invention, what takes place in the first step of the method is the provision of a film by means of a feed apparatus, which comprises at least one roll, over which the film is fed from a film supply to a rotating roll for perforation.

Expediently, the provided films consist of plastic. The material of the film is preferably a plastic material, which does not form any adhesive bonds with the foam system and withstands the foaming pressures without additional bracing mold. Alternatively, if other films are used, for example of paper or fabric, the foaming in the film sheath may also take place in a bracing mold, which defines the outer contour of the film as it expands during the foaming process.

In the inventive method, the film is preferably provided as a perforated film. Suitable film materials, among others, are polymers, such as, for example, silicone, polyethylene, polypropylene, polyurethane, polyvinyl chloride, rubber and/or mixtures thereof. Preferably the film is provided as a polyethylene film. In a particularly preferred embodiment of the film, the film is a perforated polyethylene film.

Perforation of the film can be achieved by means of a rotating roll or other means suitable for generating a perforation. Preferably the perforation of the film takes place by means of a rotating roll with attached needles. Alternatively, the perforation may also be generated by slit and hole punches. The perforation permits ambient air trapped in the film tube as well as reaction gases evolved during the foaming reaction of the free-flowing reaction mixture to escape and thus prevents gas inclusions, which may cause bubble formation inside the profile element or under the film. Because of the perforation and thus the ability of the gas to escape, uniform shaping is assured.

In a subsequent step of the inventive method, the film is laid flat on a conveying means, preferably a conveyor belt or treadmill, and passed over a forming shoulder, where the side-edge regions of the film are turned up slightly in order that the free-flowing reaction mixture can be applied in a subsequent step.

According to the invention, a deformable free-flowing reaction mixture is used in the method. This material may be either plastically or elastically deformable. Preferably the deformable free-flowing reaction mixture is a polyethylene, a polyurethane or a cellular-rubber mixture. In particular, the profile element in finished condition consists of a material that is resilient after compression, such as foam, sponge rubber, cellular rubber or the like. Common foams such as polyethylene and polyurethane foams or cellular rubber can be mentioned as foam material. This foam may be an open-celled foam with very low air passage resistance, or else an approximately closed-celled foam with extremely low air permeability values. Even foams with air permeability values lying between the two extreme cases mentioned in the foregoing may be used within the scope of the present invention. Preferably, the free-flowing reaction mixture is a polyurethane mixture.

It has proved advantageous when the profile element manufactured according to the inventive method consists of a slow-burning foam, such a cellular rubber or polyurethane foam, for example, which is jacketed with a film. In the case of a slow-burning foam, there is no possibility that fire will be propagated by the foam. Spontaneous inflammation is ruled out by the above-mentioned foam-type starting materials. It is also advantageous that no dripping occurs in the event of fire. A slow-burning foam should still have at least 20%, still at least 25%, preferably still at least 30%, between 20% and 60%, between 20% and 40%, preferably between 25% and 30% of its initial volume in a temperature range between 500° C., and 800° C. Furthermore, a slow-burning foam should still have at least 10%, at least 20%, preferably still at least 30%, between 10% and 40%, between 10% and 30%, preferably between 15% and 20% of its initial mass in a temperature range between 500° C., and 800° C.

Furthermore, the deformable free-flowing reaction mixture may contain appropriate additives if fire protection properties such as intumescence, for example, are desired. Under the effect of heat, such as in the event of fire, the material swells and forms an insulating layer of flame-retardant material. The formation of a voluminous insulating layer, namely an ash layer, may take place due to the chemical reaction of a mixture of compounds that are appropriately matched to one another and that react with one another under the effect of heat. Such systems are known to the person skilled in the art as chemical intumescence, and they may be used according to the invention. Alternatively, the voluminous insulating layer may be formed by swelling of an individual compound, which releases gases under the effect of heat, even though no chemical reaction has occurred between two compounds. Such systems are known to the person skilled in the art as physical intumescence, and they may also be used according to the invention. According to the invention, the two systems may be used respectively alone or together as a combination.

In a preferred embodiment of the method of the present invention, the free-flowing reaction mixture is an intumescent polyurethane mixture.

As an example, the free-flowing reaction mixture may be mixed in an upstream mixing process, e.g. already in a system suitable for application of the free-flowing reaction mixture, such as a casting system.

According to the invention, the application of the free-flowing reaction mixture takes place by uniform orthogonal dosing on an upper side of the film. In particular, it is necessary, for inventive manufacture of the profile element, that the free-flowing reaction mixture be dosed in uniformly orthogonal manner on the upper side of the open, flat film. Thereby the backing-up of the material compound that may occur in an already prefabricated tube during the manufacturing process, or insufficient material compound in the manufactured joint cord, is prevented. Preferably, the volume of the free-flowing reaction mixture to be applied is dosed such that in the fully reacted state it corresponds to the inside volume of the manufactured profile element.

The filled film is then passed by means of conveying equipment to a welding system, where a first side-edge region of the film is joined with a second side-edge region of the film to create a substantially cylindrical profile element. Preferably, the step of joining by thermal welding takes place with formation of a fish-fin weld seam. In the process, the film should completely enclose the reaction mixture.

The tubular profile element formed in this way is then passed by means of conveying equipment over a reaction section, in which foaming of the free-flowing reaction mixture takes place. Preferably, the foaming of the free-flowing reaction mixture takes place within a time interval of 15 to 90 seconds. The foaming takes place between the thermal welding system and a cutting unit. In a particular embodiment of the method of the present invention, the conveying equipment comprises a conveyor belt or treadmill with guide elements, e.g. knobs or dimples, for exactly guiding the film.

During passage over the reaction section, shaping to the desired profile geometry may optionally take place. Preferably, the desired profile geometry can be formed by at least one metal profile. Thereupon the finished profile element is passed to a cutting unit, where cutting of the profile element to the desired length takes place.

In this way the inventive method permits cost-effective, economic, continuous and endless manufacture of profile elements. The inventive method is preferably carried out by means of an apparatus for manufacturing such profile elements.

Such an apparatus for manufacturing such profile elements is provided with a casting system for mixing and applying a free-flowing reaction mixture and is characterized by a) a feed apparatus for feeding a film,
b) a roll for perforating the film,
c) at least one conveying means for laying the film flat and conveying it,
d) a forming shoulder for shaping the profile element,
e) a thermal welding system for joining a first side-edge region of the film with a second side-edge region of the film,
f) a reaction section for foaming the free-flowing reaction mixture,
g) conveying equipment for exactly guiding the film,
h) a cutting unit for cutting the profile element to the desired length, and
i) optionally at least one metal profile for shaping the profile to the desired geometry.

Preferably, the feed apparatus for feeding the film comprises at least one roll. Further preferably, the conveying equipment for exactly guiding the film comprises a conveyor belt or treadmill with guide elements, e.g. knobs or dimples. Preferably, the metal profile for shaping the desired profile geometry may be provided with any desired shape, and thus the profile geometry of the profile element can be predetermined.

Particular practical importance is attached to one special configuration of the profile element manufactured according to the invention for sealing a joint between a first building part and a second building part, wherein the profile element comprises an elongated connecting element and at least two sealing regions, which are positioned on the connecting element, along the outer periphery, spaced apart, side-by-side and running in the longitudinal direction of the connecting element. Preferably, the profile element manufactured according to the invention is used for acoustic, smokeproof and/or fireproof sealing of connecting joints in drywalls. In this connection, it is particularly preferred that the profile element be positioned in the upper region of the connecting joint and be configured to seal the joint from the outside.

Preferred cross-section shapes of the sealing regions of the profile element manufactured according to the invention are round profile and polygonal profile, especially rectangular profile, square profile, parallelogram profile and triangular profile. Round profile is particularly preferred. Nevertheless, other or mixed profile geometries are also conceivable and possible, as long as the sealing regions adjoin both building parts after installation of the profile element and are able to seal the joint that is present between the building parts.

The dimension and profile geometry as well as the materials of the profile element manufactured according to the invention are chosen to correspond to the planned use of the profile element.

In general, the dimension of the profile element manufactured according to the invention is chosen as a function of the profiles being used and of the material being used. The dimension must be chosen such that the profile element fills the gap between the gypsum board and the ceiling and bears sealingly both on the ceiling and on the gypsum board. If a vertical movement of the gypsum boards is to be permitted, the profile element, especially the sealing regions, must follow the movement of the gypsum board, so that the contact with the gypsum board is not torn apart and no spaces are able to form between sealing region and gypsum board. For this purpose, the profile element manufactured according to the invention consists of resilient and compressible material, such as polyurethane foam, and is appropriately precompressed during mounting of the gypsum board, so that a downward movement of the gypsum board, whereby the gap between this and the ceiling becomes larger, can be followed. In this way, the preadjusted freedom of movement of the gypsum board determines the dimension of the profile element.

The region of the connecting element disposed between the two sealing regions defines a support region, which consists only of the connecting element. This support region is dimensioned such that it corresponds at least to the width of the web of the channel profile. Hereby the installation and especially the positioning of the profile element on the web of the channel profile are facilitated.

The positioning of the profile element on a building part may be achieved in one step. It is also possible that the profile element in turn has means for fastening to a building part, such as a drywall profile, for example in the form of a self-adhesive layer, in the form of interlocking or frictionally acting means, such as suitable profiled shapes or the like. The profile element manufactured according to the invention is preferably positioned on a building part in one step.

The use of a profile element manufactured according to the invention comprises, before attachment of a first building part, positioning on the first building part, and then fastening together therewith on a second building part in the usual way, e.g. by screws or nails. Preferably the first building part is a frame profile of a drywall studwork, for example a channel profile, and the second building part is a wall, a ceiling or a floor of a building structure. Particularly preferably, the first building part is a channel profile and the second building part is a ceiling. In this arrangement, the profile element is positioned in the outer region of the joint, especially of the connecting joint, and is configured to seal the joint from the outside.

When the profile element manufactured according to the invention is used on the channel profile and abutted with the ceiling, irregularities in both building parts can be evened out and simple positioning without adhesive bonding is possible. Furthermore, the joint spacing can be controlled by the subsequent positioning of the gypsum board as well as by the choice of sealing material and/or geometric configuration of the profile element.

The profile element manufactured according to the invention can be applied on all kinds of connecting joints in which one building part meets another building part. Accordingly, the profile element may be used on all profiles, even closed profiles or wooden beams, which must be sealed to a connecting face.

A particularly preferred use of the profile element manufactured according to the invention therefore relates to the sealing of profiles in dry construction, wherein the first building part is a floor, a ceiling or a wall of a building element, for example a masonry structure or concrete building element, and the second building part is a ceiling, floor or wall profile or a metal or wood studwork of a dry construction element. The profile may be any of the profiles commonly used for dry construction, regardless of whether it has a slotted or non-slotted web or slotted or non-slotted flange. The further building parts are gypsum boards, which bear closely on the profiles and are fastened to the studwork. In order to permit vertical movement of the gypsum boards, for example in the event of an earthquake, the gypsum boards are mounted to be vertically movable at a spacing from a wall, a floor or a ceiling. Thereby a space (also referred to as joint herein) is formed between the gypsum board and the wall, the floor or the ceiling. This joint is filled by the profile element, so that the profile element seals the joint against sound and/or smoke and, depending on material of the sealing strip, also optionally against fire.

Without restricting the scope of protection of the invention, the invention will be described in more detail on the basis of the manufacture of an inventive profile element by means of an apparatus, which is schematically illustrated in FIG. 1.

In the apparatus, illustrated in FIG. 1, for manufacturing a profile element 1, a polyethylene film is passed from a film stock 3 by means of a feed apparatus over at least one roll 4, where perforation takes place. The perforation is performed by a rotating roll 4 with attached needles. The film is then laid flat on a conveying means 5 and passed over a forming shoulder 6, where the side-edge regions of the film are turned up in order that a free-flowing intumescent polyurethane material can be applied. The free-flowing polyurethane material is mixed by means of a casting system 2 and applied to the film by uniform orthogonal dosing on the upper side of the film. The film is then passed by means of conveying means 5 to a thermal welding system 7, where a first side-edge region of the film is joined with a second side-edge region of the film by thermal welding to produce a fish-fin weld seam. Thereafter the tubular profile element formed in this way is passed by means of conveying equipment 9 over a reaction section 8, in which foaming of the polyurethane mixture takes place. The desired profile geometry is shaped by at least one metal profile 11. Thereupon the finished profile element 1 is passed to a cutting unit 10, where cutting of profile element 1 to the desired length takes place.

Figure 2A:
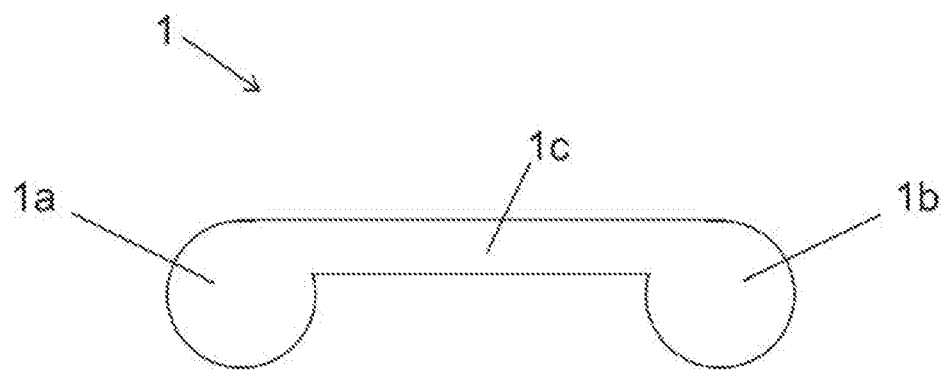
FIG. 2a shows a sketched front view of an embodiment of a profile element manufactured according to the invention.
Figure 2B:
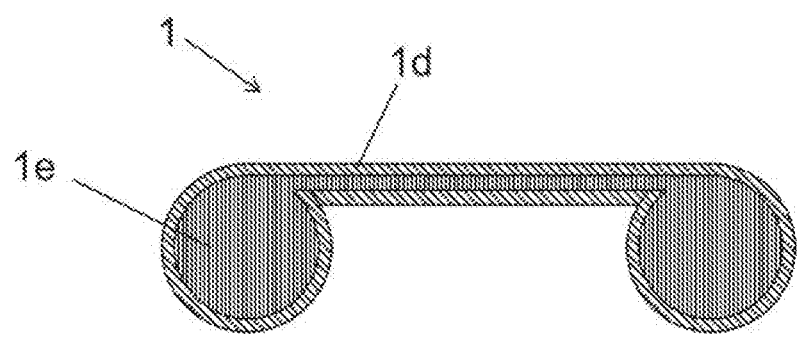
FIG. 2b shows a cross section through an embodiment of a profile element manufactured according to the invention.
Figure 2C:
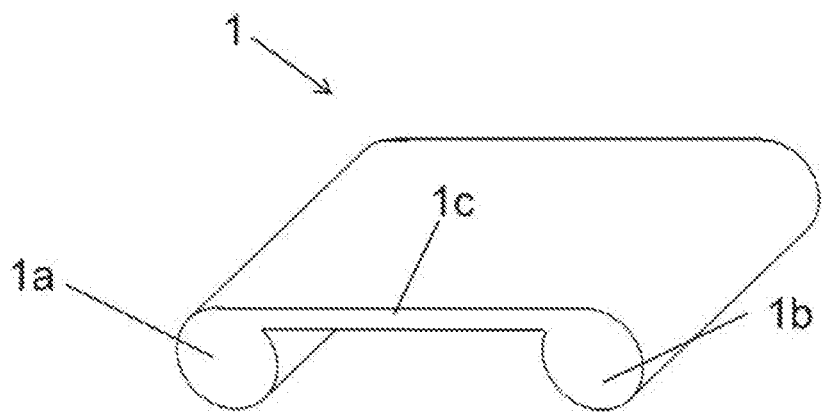
FIG. 2c shows a perspective view of an embodiment of a profile element manufactured according to the invention.

FIGS. 2a to 2c show a preferred embodiment of a profile element 1 manufactured according to the invention. Profile element 1 has two sealing regions 1a and 1b, which are positioned on the outer peripheries of connecting element 1c. Sealing regions 1a and 1b have a round profile and a solid profile, and connecting element 1c has a solid profile. Sealing regions 1a and 1b and connecting element 1c consist of a compressible polyurethane foam (1e), which optionally contains fire-protection additives. Polyethylene film 1d completely encloses the polyurethane foam.

Figure 3:
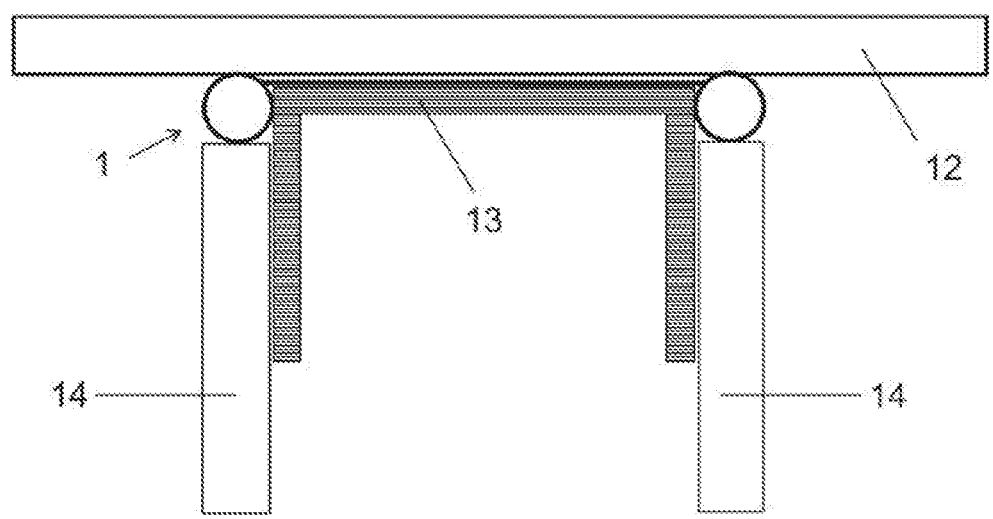
FIG. 3 shows the application of an embodiment of a profile element manufactured according to the invention for acoustic, smokeproof and/or fireproof sealing of connecting joints in drywalls.

FIG. 3 sketches the application of the embodiment of a profile element, illustrated in FIGS. 2a to 2b and manufactured according to the invention, for acoustic, smokeproof and/or fireproof sealing of connecting joints in drywalls. To seal the gap between a ceiling 12, channel profile 13 of a drywall studwork and gypsum boards 14, in the first step, profile element 1 is laid on the web of channel profile 13 and, in the second step, is fastened together therewith on ceiling 12 in the usual way, e.g. by screws or nails. Then, in a last step, gypsum boards 14 are applied on the flanges of channel profile 13 and pushed upward in the direction of ceiling 12, whereupon a gap remains between the top edge of gypsum board 14 and ceiling 12, which is filled with sealing regions 1a and 1b of profile element 1, in order to permit vertical movement, for example, of gypsum board 14. Thereby sealing regions 1a and 1b are pressed together and thus seal the gap between ceiling 12 and channel profile 13 and the gap between ceiling 12 and gypsum board 14. Thus profile element 1 is positioned in the upper region of the connecting joint and is configured to seal the joint from the outside.

As is obvious from the foregoing explanations, the inventive method is suitable in particular for manufacturing, in cost-effective, economic, continuous and endless manner, a profile element for acoustic, smokeproof and/or fireproof sealing of connecting joints in drywalls, especially of expansion joints.

The inventive method and the inventive apparatus are characterized in particular by the following advantages compared with prior art systems:

Because of the uniform orthogonal dosing on the surface of the film, no contamination of possible process supply lines occurs, since the foam comes into contact only with the film and not with further apparatus components. Furthermore, the apparatus permits quick setup for other dimensions and diameters of the desired profile element, e.g. by exchanging the forming shoulders and adjusting the film width as well as the desired length of the profile element, without laborious setup. The inventive method and the apparatus permit the manufacture of profile elements with a diameter of approx. 25 mm to approx. 70 mm and a length of up to 5 m.

Due to the flexible use of several metal profiles, the profile geometry can be freely configured, depending on the desired service area. The film of the profile element manufactured according to the invention simultaneously functions as a mounting aid, i.e. further mounting accessories are not necessary, and it is not removed before use. This further has the advantage that the profile element can be mounted quickly and that the foam is protected from sprayed or splashed water as well as during installation.

Furthermore, the inventive method and device prevent the backing-up of the material compound that may occur in an already prefabricated tube during the manufacturing process, or they prevent insufficient material compound in the manufactured joint cord. Furthermore, the intermixing quality/homogeneity of the foam is not influenced by the shaping step.

As is also obvious from the foregoing explanations, the profile element manufactured according to the invention is particularly suitable for safely sealing a building-structure joint between two adjacent building parts in simple manner, especially against sound and/or smoke and optionally also against fire.

Furthermore, application is very mounting-friendly, since no additional fastening of the profile element, for example to the profile or to the ceiling, is necessary. Accurately fitting application of the profile element, for example against a profile, is likewise unnecessary, by virtue of the self-centering of the profile element during mounting of the profile on a building part. Mounting is therefore conceivably easy, and the working effort for mounting the profile element is greatly reduced. The profile element manufactured according to the invention therefore achieves safe and reliable sealing of joints between two building parts, especially between a profile of a dry-construction studwork and a building part adjacent thereto, such as, for example, a ceiling, wall or floor. In this connection, two-sided sealing can be achieved in only one operation, by providing a prefabricated profile element.

Furthermore, it has been shown that outstanding imperviousness can be achieved with the profile element manufactured according to the invention, since good compressibility of the sealing regions is ensured without additional auxiliary means by the choice of the sealing materials and/or geometric configuration. The profile elements manufactured according to the invention also make it possible to adjust the correct spacing of gypsum board from the connecting building part without additional auxiliary means, in order to achieve the said precompression.

By means of the profile element manufactured according to the invention, it is also possible to ensure that, merely by the choice of the sealing materials and/or geometric configuration, sufficient material is installed to ensure excellent imperviousness with maximum absorption of movement.

Furthermore, with the profile element manufactured according to the invention, irregularities of the surface of a building part can be reliably sealed as soon as one building part is disposed on another building part, since the sealing elements of the joint-sealing tape are pressed sufficiently firmly against the surface of the one building part and at the same time against the side faces of the other building part.

In view of the foregoing, it is obvious that the objects of the invention have been solved. Since various modifications can be made to the method described in the foregoing, to the apparatus, to the profile element manufactured according to the invention and to the use thereof without departing from the scope of the invention, it is intended that all subject matters contained in the foregoing description be interpreted as illustrative and not in a restrictive sense.

The invention claimed is:

1. A profile element, manufactured by a method comprising:
    a) providing a film,
    b) applying a free-flowing reaction mixture on an upper side of the film,
    c) joining a first side-edge region of the film with a second side-edge region of the film to create a profile element of a first shape,
    d) foaming the free-flowing reaction mixture, and
    e) shaping the profile element to a second shape different from the first shape by applying pressure to the film using at least one profile corresponding to the second shape,
    wherein foaming the free-flowing reaction mixture of d) is performed during a first period and shaping the profile element of e) is performed during a second period at least partially overlapping the first period,
    wherein a volume of the free-flowing reaction mixture to be applied is dosed such that, in a fully reacted state, the volume corresponds to an inside volume of the profile element with the film completely enclosing the free-flowing reaction mixture, and
    wherein the at least one profile applies the pressure during the first period of time while the free-flowing reaction mixture is being foamed, to thereby simultaneously foam the free-flowing reaction mixture and shape the profile element with the at least one profile for a duration of overlap between the first and second periods, the pressure applied by the at least one profile to form at least a first region and a second region of the profile element, the first and second regions having respective first and second shapes and joined to have a continuous one-piece construction formed from the free-flowing reaction mixture.

2. The profile element according to claim 1, further comprising: cutting the profile element to a desired length.

3. The profile element according to claim 1, wherein said b) applying comprises uniform orthogonal dosing of the free-flowing reaction mixture on an upper side of the film.

4. The profile element according to claim 1, wherein said joining c) comprises joining the first side-edge region with the second side-edge region of the film by thermal welding.

5. The profile element according to claim 1, wherein the film comprises polyethylene and is perforated.

6. The profile element according to claim 1, wherein the free-flowing reaction mixture is a polyurethane mixture.

7. The profile element according to claim 6, wherein the polyurethane mixture is an intumescent polyurethane mixture.

8. The profile element according to claim 1, further comprising:
    a third region between the first region and the second region,
    wherein the third region has a third shape different from the first shape or the second shape.

9. The profile element according to claim 1, wherein the foaming d) takes place within a time interval of 15 to 90 seconds.

10. The profile element according to claim 1, wherein the method is a continuous and endless method.

11. A method of sealing a connecting joint in drywall, comprising:
    attaching the profile element according to claim 1 to a connecting joint in drywall,
    wherein the attaching includes sealing the connecting joint to provide an acoustic sealing, a smokeproof sealing, and a fireproof sealing.

12. The method according to claim 11, wherein, upon the attaching, the profile element is attached to an upper region of the connecting joint and is configured to seal the connecting joint from an outside of the connecting joint.

13. A method of making a profile element, comprising:
    forming the profile element with an apparatus comprising:
    a) a feed apparatus for feeding a film,
    b) a roll for perforating the film,
    c) at least one conveyor for laying the film flat and conveying the film,
    d) a forming shoulder to apply pressure to the film for shaping the profile element, e) a thermal welding system for joining a first side-edge region of the film with a second side-edge region of the film to form the profile element of a first shape, f) a reaction section for foaming a free-flowing reaction mixture, g) at least one shaping profile to shape the profile element to a second shape different from the first shape, and h) a cutting unit for cutting the profile element to a desired length, wherein the reaction section is to foam the free-flowing reaction mixture during a first period and the at least one shaping profile is to shape the profile element during a second period at least partially overlapping the first period, wherein the at least one shaping profile has a shape which simultaneously applies pressure to the film of the profile element during the first period of time while the free-flowing reaction mixture is being foamed, to thereby simultaneously foam the free-flowing reaction mixture and shape the profile element with the at least one shaping profile for a duration of overlap between the first and second periods, the pressure applied by the at least one shaping profile to form at least a first region and a second region of the profile element, the first and second regions having respective first and second shapes and joined to have a continuous one-piece construction formed from the free-flowing reaction mixture.

14. The profile element produced by the method according to claim 13.

15. The profile element according to claim 5, wherein the film is perforated before foaming the free-flowing reaction mixture, and wherein the film comprises polyethylene.

16. The profile element according to claim 1, wherein
the at least one profile applies pressure to the film to simultaneously form a third region between the first and second regions, and
the third region has a third shape different from the first shape and the second shape and is joined to have a continuous one-piece construction with the first and second regions.

17. The profile element according to claim 16, wherein the first shape is same as the second shape.

18. The profile element according to claim 16, wherein the first region is spaced from the second region by a predetermined distance, which corresponds to a distance between a first building feature and a second building feature to be sealed by the profile element.

19. The profile element according to claim 18, wherein
the first building feature is a ceiling, and
the second building feature is a gypsum board or a feature of the gypsum board.

20. A profile element, comprising:
a film, wherein a first side-edge region of the film is joined with a second side-edge region of the film, and
a foamed reaction mixture, wherein a volume of the foamed reaction mixture corresponds to an inside volume of the profile element, with the film completely enclosing the foamed reaction mixture, wherein the profile element comprises a first region and a second region, respectively having a first shape and a second shape, and a third region connecting the first region and the second region, wherein the first region and the second region are joined by the third region to have a continuous one-piece construction formed from the foamed reaction mixture and the third region has a shape different from the first shape and the second shape.

* * * * *